United States Patent
Li et al.

(10) Patent No.: US 9,599,827 B2
(45) Date of Patent: Mar. 21, 2017

(54) THREE-DIMENSIONAL DISPLAY DEVICE AND LC BARRIER

(71) Applicant: BOE Technology Group Co., Ltd., Beijing (CN)

(72) Inventors: Wenbo Li, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 14/013,148

(22) Filed: Aug. 29, 2013

(65) Prior Publication Data
US 2014/0063384 A1    Mar. 6, 2014

(30) Foreign Application Priority Data
Aug. 29, 2012 (CN) .......................... 2012 1 0313818

(51) Int. Cl.
| | |
|---|---|
| G02B 27/22 | (2006.01) |
| H04N 13/04 | (2006.01) |
| G02F 1/137 | (2006.01) |
| H01J 11/10 | (2012.01) |
| H01J 11/44 | (2012.01) |
| G02F 1/1362 | (2006.01) |

(52) U.S. Cl.
CPC .......... G02B 27/2214 (2013.01); H01J 11/10 (2013.01); H01J 11/44 (2013.01); H04N 13/0411 (2013.01); H04N 13/0413 (2013.01); H04N 13/0454 (2013.01); *G02F 1/1362* (2013.01); *G02F 1/13718* (2013.01)

(58) Field of Classification Search
CPC ..... G02F 1/13718; G02F 2001/133541; G02F 1/1347; H04N 13/0409; G02B 27/2214; G02B 27/22
See application file for complete search history.

(56) References Cited

U.S. PATENT DOCUMENTS

| | | | |
|---|---|---|---|
| 2008/0192157 A1* | 8/2008 | Gan et al. | 349/25 |
| 2008/0198294 A1* | 8/2008 | Hwang et al. | 349/62 |
| 2009/0251625 A1 | 10/2009 | Ohjeong et al. | |
| 2010/0079700 A1* | 4/2010 | Hasegawa et al. | 349/62 |

(Continued)

FOREIGN PATENT DOCUMENTS

CN          202735600 U     2/2013

OTHER PUBLICATIONS

First Office Action issued by the Chinese Patent Office for Chinese Patent Application No. 201210313818X on Mar. 31, 2014, 6pgs.
(Continued)

*Primary Examiner* — Jessica M Merlin
(74) *Attorney, Agent, or Firm* — Ladas & Parry LLP (57) ABSTRACT

A 3D display device and LC barrier are disclosed. The 3D display device comprises a non-polarized light display unit and an LC barrier. The LC barrier comprises a liquid crystal cell arranged at one side of the non-polarized light display unit, and the liquid crystal cell comprises an upper substrate, a lower substrate and a cholesteric liquid crystal layer between the substrates; a first quarter-wave plate provided on the upper substrate; a polarizer provided on the first quarter-wave plate; an absorption axis of the polarizer forms a predetermined angle with a fast axis of the first quarter-wave plate.

13 Claims, 5 Drawing Sheets

(56) References Cited

U.S. PATENT DOCUMENTS

2011/0043713 A1 2/2011 Hui et al.
2012/0162762 A1* 6/2012 Takahashi ................ 359/462
2013/0050597 A1* 2/2013 Do et al. ...................... 349/15

OTHER PUBLICATIONS

English translation of First Office Action issued by the Chinese Patent Office for Chinese Patent Application No. 201210313818X on Mar. 31, 2014, 3pgs.
Extended European Search Report for Patent Application No. 13182046.6 dated Dec. 9, 2013, twelve (12) pages.

* cited by examiner

THREE-DIMENSIONAL DISPLAY DEVICE AND LC BARRIER

CROSS REFERENCE TO RELATED APPLICATIONS

This application claims priority from Chinese National Application No 201210313818.X filed on Aug. 29, 2012, the contents of which are incorporated herein by reference.

TECHNICAL FIELD

Embodiment of the present disclosure relates to a three-dimensional (3D) display device and a liquid crystal (LC) barrier.

BACKGROUND

As is well known, a two-dimensional (2D) display is unable to present information about depth of field to viewer as the real world does. The reason why a person can discern depth of field (3D effect) is that the person's two eyes have positional deviation caused by the interocular distance between the two eyes. Two pictures having binocular parallax become a pair of 3D pictures which, after being merged based on human brain's visual sense, produce a three-dimensional effect.

3D display may be divided into glassless-type 3D display and glass-type 3D display. The main stream technology of glass-type 3D display comprises shutter glasses technology and pattern retarder technology, while the glassless-type 3D display technology mainly involves application of parallax barrier, lenticular lens barrier or the like. Among the barriers for glassless-type 3D display, the most mature one is the parallax barrier technology, while the LC barrier technology can be used to realize switching between 2D and 3D display.

A 3D display device can use a liquid crystal panel as the display unit; light exiting from the liquid crystal panel is polarized light, thus when an LC barrier is adopted to realize 3D display, only one polarizer is needed to achieve 3D display. However, in the 3D display device having a display panel emitting non-polarized light for display, such as an organic light emitting display (OLED), a plasma display panel (PDP), and a cathode ray tube (CRT), as the display unit, the emitted light is close to natural light, and therefore, when an LC barrier is adopted to realize 3D display, two polarizers are needed to achieve 3D display, which leads to severe light loss. The brightness in 3D display is not high.

SUMMARY

Embodiments of the present disclosure provide a three-dimensional display device and an LC barrier to improve the brightness for the three-dimensional display device to realize 3D display.

One aspect of the present disclosure provides a three-dimensional display device comprising a non-polarized light display unit and an LC barrier, the LC barrier comprising a liquid crystal cell arranged at one side of the non-polarized light display unit, the liquid crystal cell comprising an upper substrate, a lower substrate and a cholesteric liquid crystal layer provided between the upper substrate and the lower substrate; a first quarter-wave plate provided on the upper substrate; a polarizer provided on the first quarter-wave plate. The absorption axis of the polarizer is at a predetermined angle to the fast axis of the first quarter-wave plate, such that circularly polarized light emitted out from the liquid crystal cell, after passing through the first quarter-wave plate, becomes linearly polarized light, and the linearly polarized light then can be completely absorbed by the polarizer.

Another aspect of the present disclosure provides an LC barrier, comprising: a liquid crystal cell comprising an upper substrate, a lower substrate and a cholesteric liquid crystal layer sandwiched between the upper substrate and the lower substrate; a first quarter-wave plate provided on the upper substrate; a polarizer provided on the first quarter-wave plate, wherein an absorption axis of the polarizer is at a predetermined angle to a fast axis of the first quarter-wave plate, such that circularly polarized light emitted out from the liquid crystal cell, after passing through the first quarter-wave plate, becomes linearly polarized light, and the linearly polarized light then can be completely absorbed by the polarizer.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

In order to describe the technical solution of the embodiment of the present disclosure more clearly, a brief introduction will be made of the attached drawings of the embodiments.

DETAILED DESCRIPTION

To make clearer the aims, technical solutions and advantages to be solved by the embodiments of the present disclosure, a detailed description of the disclosure will be made with reference to the accompanying drawings and detailed embodiments. It should be noted that the drawings are only used schematically, but not drawn according to actual sizes.

Unless defined otherwise, the technical or scientific terminology being used should take the meaning usually understood by the ordinary skilled in this art of the present disclosure. The terms "first," "second," etc., which are used in the description and the claims of the present application for invention, are not intended to indicate any sequence, amount or importance, but distinguish various components. The expression "a," "an," "the" or the like does not mean quantitative restriction, but refers to the existence of at least one. The phrases such as "comprise," "include," "contain" or the like intend to mean that the elements or articles before the phrases encompass the elements or articles and the equallent thereof listed after the phrases, and do not exclude other elements or articles. "Connecting," "coupling" or the like is not limited to physical or mechanical connection, but may comprise electrical connection regardless of being direct or indirect. Furthermore, the phrases "on", "below", "left", "right" and so on are used only for describing a relative positional relationship, which will be varied correspondingly when the described objects are changed in its absolute position.

Figure 1A:
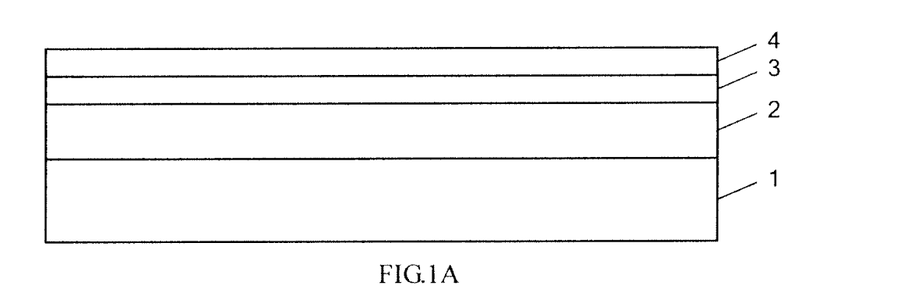
FIG. 1A is a structural illustration of a three-dimensional display device according to a first embodiment of the present disclosure.
Figure 1B:
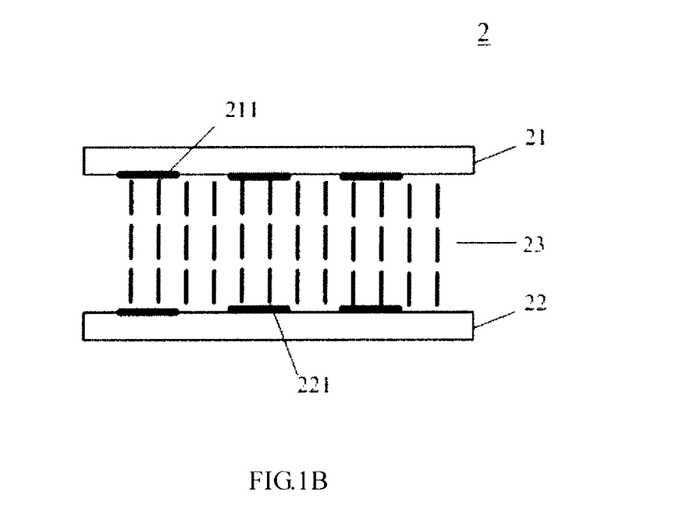
FIG. 1B is a structural illustration of a liquid crystal cell according to an embodiment of the present disclosure.

FIG. 1A is a partial structural illustration of a three-dimensional (3D) display device according to a first embodiment of the present disclosure; FIG. 1B is a structural illustration of a liquid crystal cell according to an embodiment of the present disclosure.

Referring to FIG. 1A, the 3D display device comprises: a non-polarized light display unit 1 (a display unit emitting non-polarized light for display); a liquid crystal cell 2 provided on the non-polarized light display unit 1 (light-exiting side), the liquid crystal cell 2 comprising a cholesteric liquid crystal layer; a first quarter-wave plate 3 provided on the liquid crystal cell 2; and a polarizer 4 provided on the first quarter-wave plate 3. The absorption axis of the polarizer 4 forms a predetermined angle with the fast axis of the first quarter-wave plate 3, such that after the circularly polarized light exiting from the liquid crystal cell 2 passes through the first quarter-wave plate 3 and becomes linearly polarized light, the linearly polarized light then can be completely absorbed by the polarizer 4.

At this time, with respect to the cholesteric liquid crystal layer, the first quarter-wave plate 3 is provided external side of the liquid crystal cell 2, and the polarizer 4 is provided further external side of the first quarter-wave plate 3. Here, the external side and the inner side are defined with reference to the liquid crystal display (LCD) cooperating with the LC barrier (e.g., see FIG. 4); the external side is the side away from the LCD, and the inner side is the side facing the LCD in all embodiments.

The non-polarized light display unit may be a display device from which non-polarized light exits for display, such as OLED, PDP and CRT.

It should be noted that, the cholesteric liquid crystal mentioned in the embodiment of present application can be obtained by adding a left-handed chiral compound or a right-handed chiral compound into nematic phase liquid crystals, or otherwise may be natural cholesteric liquid crystal, and the present disclosure is not limited thereto.

When the cholesteric liquid crystal layer is left-handed liquid crystal, the absorption axis of the polarizer 4 forms an angle of −45° with the fast axis of the first quarter-wave plate 3 (viewing from top to bottom); when the cholesteric liquid crystal layer is right-handed liquid crystal, the absorption axis of the polarizer 4 forms an angle of 45° with the fast axis of the first quarter-wave plate 3 (viewing from top to bottom).

The liquid crystal cell 2, the first quarter-wave plate 3 and the polarizer 4 constitute the LC barrier of the 3D display device. When 3D display is required, a voltage is applied to a part of the liquid crystal cell 2 to make the part become light-transparent such that an opening area (i.e., a transmitting zone) of the LC barrier is formed, while the rest part of the liquid crystal cell 2 which is not applied with the voltage remains not light-transparent and forms a light-blocking area of the LC barrier; and when 2D display is required, the voltage is applied to the whole liquid crystal cell to make the whole liquid crystal cell light-transparent such that light can transmit through the entirety of the liquid crystal cell.

It can be understood that only one polarizer is comprised in the LC barrier, and this configuration saves one polarizer compared with the conventional 3D display device based on a non-polarized light display unit, thus the loss of light during displaying 3D images is relatively less and the brightness for 3D display can be improved.

Figure 2:
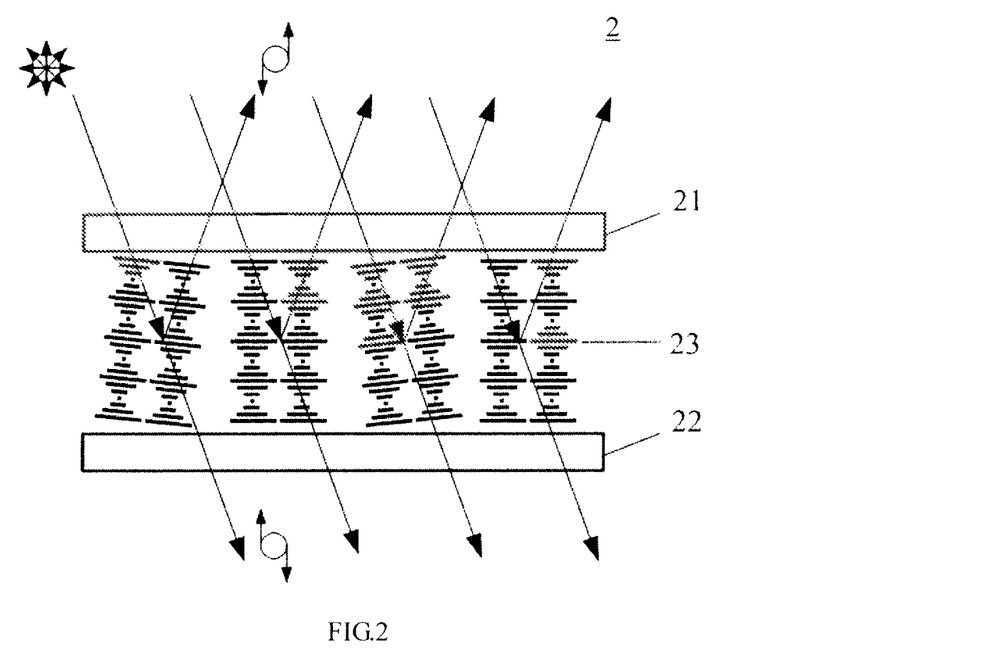
FIG. 2 is an optical path diagram of the three-dimensional display device illustrated in FIG. 1 in which a voltage is not applied to the liquid crystal cell.
Figure 3:
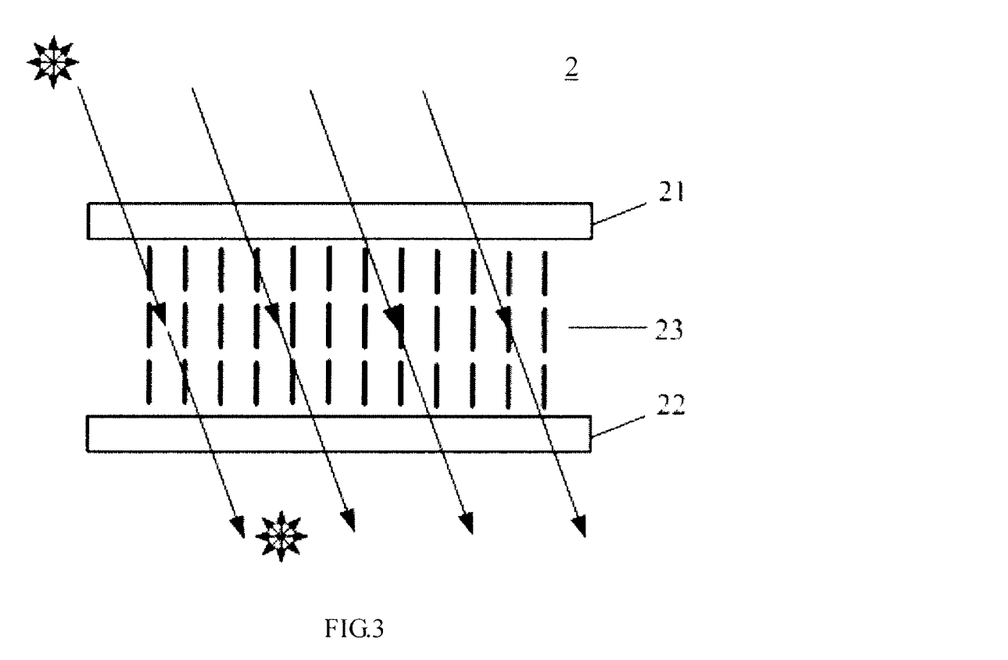
FIG. 3 is an optical path diagram of the three-dimensional display device illustrated in FIG. 1 in which a voltage is applied to the liquid crystal cell.

FIG. 2 is an optical path diagram of the 3D display device illustrated in FIG. 1 where a voltage is not applied to the liquid crystal cell; FIG. 3 is an optical path diagram of the 3D display device illustrated in FIG. 1 where a voltage is applied to the liquid crystal cell.

With reference to FIG. 1B, the liquid crystal cell 2 may comprise an upper substrate 22, a lower substrate 21, and a liquid crystal layer 23 sandwiched between the upper substrate 22 and the lower substrate 21. The upper substrate 22 and the lower substrate 21 can be combined together with a sealing agent to for a cell. The liquid crystal layer 23 is a cholesteric liquid crystal layer.

The side of the upper substrate 22 facing the lower substrate 21 is provided with a plurality of strip-shaped first electrodes 211 arranged to be spaced from each other by a preset interval therebetween; the side of the lower substrate 22 facing the upper substrate 21 is provided with a plurality of strip-shaped second electrodes 221 at positions corresponding to those first electrodes 211, and thus the second electrodes 221 may be also spaced from each other by a preset interval therebetween. The first and second electrodes may be formed of a transparent conductive material, for example, indium tin oxide (ITO), indium zinc oxide (IZO), or the like. Each of the upper substrate 22 and the lower substrate 21 may a glass substrate, a plastic substrate, or the like. By applying a proper voltage between the first electrode 211 and the second electrode 221 corresponding to each other in pairs, a vertical electric field can be generated within the liquid crystal cell 2 (that is, the electric field is perpendicular to the surfaces of the upper and lower substrates).

The liquid crystal cell 2 of the embodiment of the present disclosure is achieved with cholesteric liquid crystal devices, FIG. 2 shows the example using left-handed liquid crystal which may be achieved by adding left-handed chiral compound into nematic phase liquid crystal or may be natural cholesteric liquid crystal.

To facilitate understanding, the drawings of the present application use a symbol ✳ for natural light, a symbol ⁃ for linearly polarized light with a polarization direction parallel to the paper surface, a symbol ᑫ for right-hand circular polarized light, a symbol ᑭ for left-hand circular polarized light, and a symbol ⊙ for the linearly polarized light with a polarization direction perpendicular to the paper surface.

As illustrated in FIG. 2, when no voltage is applied to the liquid crystal cell 2 (that is, no voltage is applied between the first electrode 211 and the second electrode 221 in pairs), the liquid crystal molecules in the liquid crystal cell 2 are aligned in parallel orientation, achieving a planar texture. The left-handed liquid crystal performs Bragg reflection on a part of incident light (natural light), the reflected light is left-hand circular polarized light while the transmitted light (that is the light passing through the liquid crystal) is right-hand circular polarized light, thereby achieving selective reflection.

It's to be understood by those skilled in the relevant art that, when right-handed liquid crystal is used and the incident light is natural light, the reflected light is right-hand circular polarized light while the transmitted light is left-hand circular polarized light. The right-handed liquid crystal may be achieved by adding right-handed chiral compound into nematic phase liquid crystal, or may be natural cholesteric liquid crystal.

As illustrated in FIG. 3, when a proper voltage is applied to the liquid crystal cell 2 (that is, the voltage is applied between the first electrode 211 and the second electrode 221 in a pair), the liquid crystal molecule occurs deflection under the action of the vertical electric field generated and are aligned vertically. The incident light (natural light) be transmitted entirely, and the emergent light still is natural light.

Figure 4:
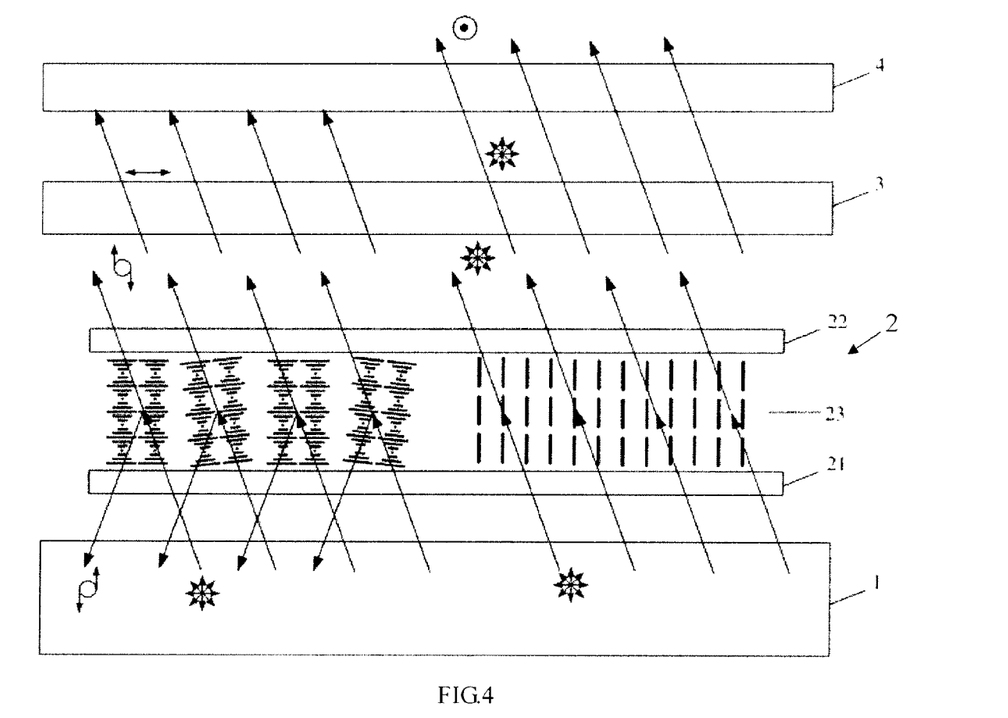
FIG. 4 is an optical path diagram of the three-dimensional display device illustrated in FIG. 1 in 3D display.

FIG. 4 is an optical path diagram of the 3D display device illustrated in FIG. 1 when performing 3D display. With reference to FIG. 4, when the cholesteric liquid crystal within the light-blocking strip-shaped areas of the LC barrier is in a state where no voltage is applied to the strip-shaped areas, that is, no voltage is applied between the corresponding strip-shaped-shaped first and second electrodes within the light-blocking strip-shaped areas of the LC barrier, and the liquid crystal molecules within the liquid crystal cell 2 are aligned in a parallel orientation, kept in the planar texture state. The natural light emitted from the non-polarized light display unit 1 passes through the cholesteric liquid crystal (for example, left-handed liquid crystal) in the planar texture state, and during that process the liquid crystal device reflects left-hand circular polarized light while transmits right-hand circular polarized light. The transmitted right-hand circular polarized light, after passing through a first quarter-wave plate 3, is converted into linearly polarized light, and because the polarization direction of the polarized light is identical to the direction of the absorption axis of the polarizer 4 provided thereon, the linearly polarized light will be absorbed and can not transmit therethrough, thereby achieving a light-blocking effect.

However, the cholesteric liquid crystal within the opening area of the LC barrier is in a power-on state, that is to say, a voltage is applied between the corresponding strip-shaped-shaped first and second electrodes within the opening area of the LC barrier. The light, which is natural light, exiting from the non-polarized light display unit 1, after passing through the vertically arranged cholesteric liquid crystal, is still natural light; further the light remains natural light even after passing through the first quarter-wave plate 3; finally after passing through the polarizer 4 on the top, the light will be converted into polarized light having a same polarization direction as the transmission axis of the polarizer. Therefore, this area can functions as an opening area in the LC barrier.

In the above embodiment, it's necessary for the polarizer 4 and the first quarter-wave plate 3 to match with each other, that is, the fast axis of the first quarter-wave plate forms an angle of 45° or −45° with the absorption axis of the polarizer 4; alternatively, the slow axis of the first quarter-wave plate 3 forms an angle of 45° or −45° with the absorption axis of the polarizer 4. Furthermore, it's further necessary for the polarizer 4 and the first quarter-wave plate 3 to match with the helicity of the cholesteric liquid crystal of the liquid crystal cell 2, so as to block the light within the light-blocking area to achieve the function of light-blocking strip-shaped areas in the LC barrier. For example, when the cholesteric liquid crystal layer adopts left-handed liquid crystal, the absorption axis of the polarizer 4 forms a degree of −45° with the fast axis of the first quarter-wave plate 3 (viewing from top to bottom); when cholesteric liquid crystal layer is right-handed liquid crystal, the absorption axis of the polarizer 4 forms an angle of 45° with the fast axis of the first quarter-wave plate 3 (viewing from top to bottom).

As to the 3D display device of the embodiment of the present disclosure, when 2D display is required, it's further needed to apply a voltage to the light-blocking strip-shaped areas, that is to say, a voltage is applied between the corresponding strip-shaped-shaped first and second electrodes of all areas in the liquid crystal cell; at this time, the liquid crystal molecules within all areas are aligned vertically, light can transmit all the areas (that is, the whole liquid crystal cell 2) and thereby achieve the switching from 3D display to 2D display.

Figure 5:
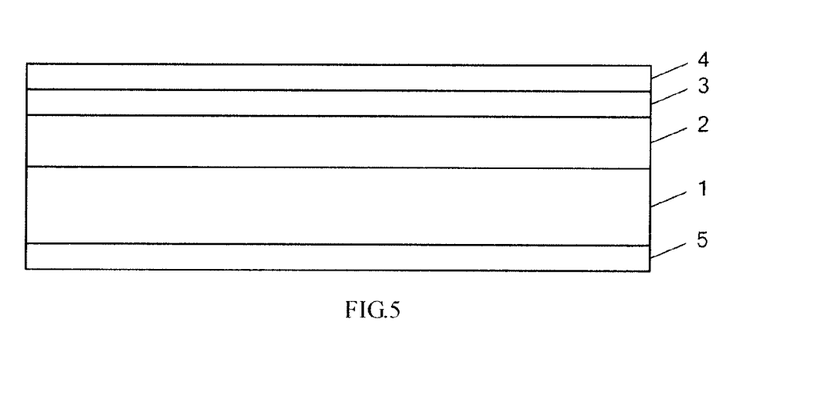
FIG. 5 is a structural illustration of a three-dimensional display device according to a second embodiment of the present disclosure.

FIG. 5 is a structural illustration of a 3D display device according to a second embodiment of the present disclosure. With reference to FIG. 5, the 3D display device comprises: a non-polarized light display unit 1; a liquid crystal cell 2 provided at one side of the non-polarized light display unit 1 (light-exiting side), the liquid crystal cell 2 adopting cholesteric liquid crystal layer; a reflector plate 5 provided at the other side of the non-polarized light display unit 1; a first quarter-wave plate 3 provided on the liquid crystal cell 2; a polarizer 4 provided on the first quarter-wave plate, the absorption axis of the polarizer 4 forming a predetermined angle with the fast axis of the first quarter-wave plate 3, such that after the circularly polarized light exiting from the liquid crystal cell 2 passes through the first quarter-wave plate 3 and becomes linearly polarized light, the linearly polarized light then can be completely absorbed by the polarizer 4.

When the cholesteric liquid crystal layer adopts left-handed liquid crystal, the absorption axis of the polarizer 4 forms a degree of −45° with the fast axis of the first quarter-wave plate 3 (viewing from top to bottom); when the cholesteric liquid crystal layer adopts right-handed liquid crystal, the absorption axis of the polarizer 4 forms a degree of 45° with the fast axis of the first quarter-wave plate 3 (viewing from top to bottom).

The embodiment 2 differs from the first embodiment in that the reflector plate 5 is provided below the non-polarized light display unit 1, such that the cholesteric liquid crystal in the planar texture state in the light-blocking strip-shaped area of the LC barrier reflects left-handed circular polarized light (when the cholesteric liquid crystal is left-handed liquid crystal) or right-handed circular polarized light (when the cholesteric liquid crystal is right-handed liquid crystal), so the light, after reflected by the reflector plate 5, can be used again (that is, recycled), thereby enhancing light intensity in the displaying field.

Other components of the second embodiment are identical to those of the first embodiment, and the principle of the second embodiment for realizing 3D display and the switching from 3D display to 2D display are also the same as that of the first embodiment, and the description would not be repeated here.

Figure 6:
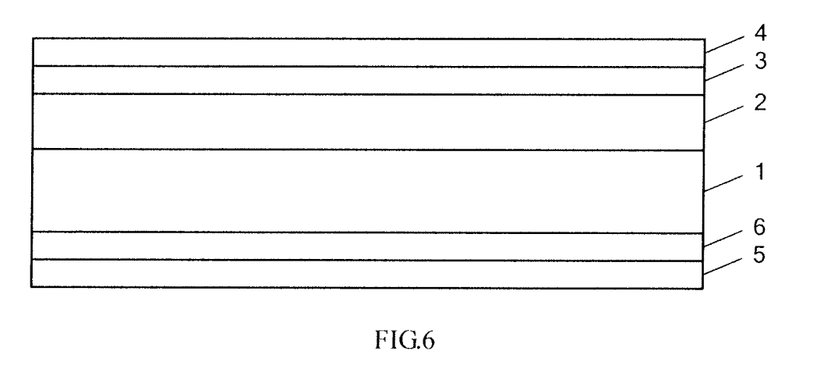
FIG. 6 is a structural illustration of a three-dimensional display device according to a third embodiment of the present disclosure.

FIG. 6 is a structural illustration of a 3D display device according to a third embodiment of the present disclosure. With reference to FIG. 6, the 3D display device comprises: a non-polarized light display unit 1; a liquid crystal cell 2 provided at one side of the non-polarized light display unit 1 (light-exiting side), the liquid crystal cell 2 including cholesteric liquid crystal layer; a first quarter-wave plate 3 provided on the liquid crystal cell 2; a polarizer 4 provided on the first quarter-wave plate 3, the absorption axis of the polarizer 4 forming a predetermined angle with the fast axis of the first quarter-wave plate 3, such that after the circularly polarized light emitted from the liquid crystal cell 2 passes through the first quarter-wave plate 3 and becomes linearly polarized light, and the linearly polarized light then can be completely absorbed by the polarizer 4; a second quarter-wave plate 6 provided at the other side of the non-polarized light display unit 1; and a reflector plate 5 provided below the second quarter-wave plate 6.

In this embodiment, with respect to the cholesteric liquid crystal layer of the liquid crystal cell, the second quarter-wave plate 6 is provided at the other external side, and the reflector plate 5 is provided further at the external side of the second quarter-wave plate 6.

When the cholesteric liquid crystal layer adopts left-handed liquid crystal, the absorption axis of the polarizer 4 forms a degree of −45° with the fast axis of the first quarter-wave plate 3 (viewing from top to bottom); when the cholesteric liquid crystal layer adopts right-handed liquid crystal, the absorption axis of the polarizer 4 forms a degree of 45° with the fast axis of the first quarter-wave plate 3 (viewing from top to bottom).

The third embodiment differs from the second embodiment in that a second quarter-wave plate 6 is further arranged between the non-polarized light display unit 1 and the reflector plate 5. In the second embodiment, after natural light passes through cholesteric liquid crystal (for example left-handed liquid crystal) in the planar texture state, part of the left-hand circular polarized light is reflected and then converted into right-hand circular polarized light after passing through the reflector plate 5. While passing through the cholesteric liquid crystal in the voltage-applied area(s) of the liquid crystal cell 2, the resultant right-hand circular polarized light can be reused and passes therethrough, and when the right-hand circular polarized light arrives at the left-handed liquid crystal in the area(s) applied with no voltage, the right-hand circular polarized light also can pass therethrough, but all of the transmitted light will be absorbed. Therefore, the second quarter-wave plate 6 is added in the embodiment 3.

Figure 7:
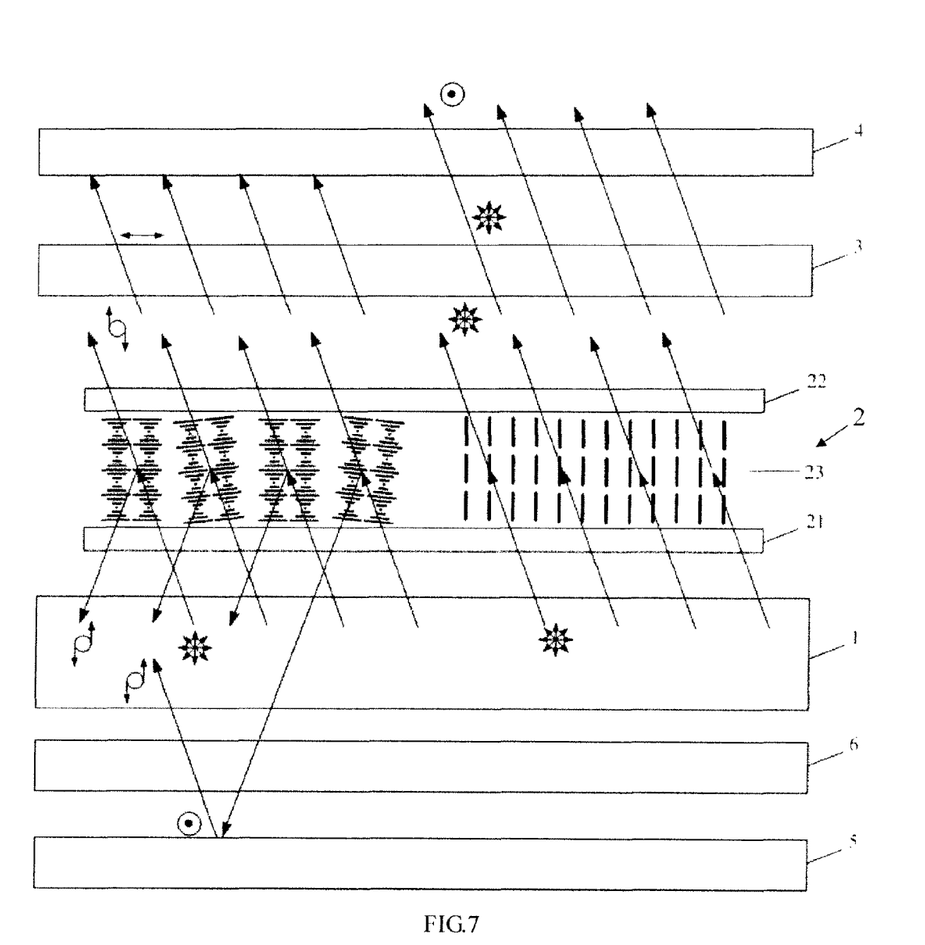
FIG. 7 is an optical path diagram of the three-dimensional display device illustrated in FIG. 6 in 3D display.

Referring to FIG. 7, after the natural light passes through the left-handed liquid crystal, then part of the left-hand circular polarized light is reflected, and the reflected left-hand circular polarized light, after passing through the second quarter-wave plate 6, is converted into linearly polarized light; this resultant linearly polarized light is reflected again by the reflector plate 5 and then passes through the second quarter-wave plate 6 and becomes left-hand circular polarized light, the resultant left-hand circular polarized light can not exit from the light-blocking strip-shaped area of the LC barrier, and after the repeated reflections (multiple reflections), can exit from the opening area of the LC barrier as much as possible, thereby further improving the brightness of the opening area of the LC barrier. FIG. 7 is a diagram taking the left-handed liquid crystal as an example, and as to right-handed liquid crystal, the principle for light path thereof is similar to that of the left-handed liquid crystal thus the description will not be repeated here for simplicity.

Further, in the above first to third embodiments, for example, the first quarter-wave plate 3 and the polarizer 4 may be integrally formed. In the above third embodiment, for example, the second quarter-wave plate 6 and the reflector plate 5 may also be integrally formed. There, it's possible to simplify the device configuration, optimize manufacturing technology and improve product yield.

Finally it should be noted that the above embodiments are only used to illustrate the technical solution of the present disclosure rather than limiting, and modification or equivalent substitution can be made to the technical solution of the present disclosure without departing from the spirit of technical solution of the present disclosure, which would be encompassed within the scope defined by the claims of the present disclosure.

What is claimed is:

1. A three-dimensional (3D) display device, comprising a non-polarized light display unit and a liquid crystal (LC) barrier, the LC barrier receiving non-polarized light emitted from the non-polarized light display unit, wherein the LC barrier comprises:
   a liquid crystal cell arranged at one side of the non-polarized light display unit, wherein the liquid crystal cell comprises an upper substrate, a lower substrate and a cholesteric liquid crystal layer provided between the upper substrate and the lower substrate, and the cholesteric liquid crystal layer receives the non-polarized light emitted from the non-polarized light display unit and emits circular polarized light without electric field applied to the cholesteric liquid crystal layer;
   a first quarter-wave plate provided on the upper substrate to convert the circular polarized light to linearly polarized light; and
   a polarizer provided on the first quarter-wave plate,
   wherein an absorption axis of the polarizer forms a predetermined angle with a fast axis of the first quarter-wave plate, such that the linearly polarized light emitted from the first quarter-wave plate then can be completely absorbed by the polarizer; and
   wherein the 3D display device has only one polarizer.

2. The 3D display device according to claim 1, further comprising: a reflector plate provided at the other side of the non-polarized light display unit.

3. The 3D display device according to claim 2, further comprising: a second quarter-wave plate provided between the non-polarized light display unit and the reflector plate.

4. The 3D display device according to claim 1, wherein a side of the upper substrate facing the lower substrate is provided with strip-shaped first electrodes arranged with an interval therebetween, and
   a side of the lower substrate facing the upper substrate is provided with strip-shaped second electrodes at positions corresponding to the first electrodes.

5. The 3D display device according to claim 4, wherein in the condition that no voltage is applied between the first electrodes and the second electrodes, no electric field is generated between the upper substrate and the lower substrate, such that liquid crystal molecules in the cholesteric liquid crystal layer are aligned in the planar texture; and
   when a voltage is applied between the first electrodes and the second electrodes, a vertical electric field is generated between the upper substrate and the lower substrate, such that the liquid crystal molecules in the cholesteric liquid crystal layer are aligned in the direction of the electric field.

6. The 3D display device according to claim 1, wherein in the condition that the cholesteric liquid crystal layer is left-handed liquid crystal, the absorption axis of the polarizer forms an angle of −45° with the fast axis of the first quarter-wave plate; and
   in the condition that the cholesteric liquid crystal layer is right-handed liquid crystal, the absorption axis of the polarizer forms an angle of 45° with the fast axis of the first quarter-wave plate.

7. The 3D display device according to claim wherein the first quarter-wave plate and the polarizer are integrated.

8. The 3D display device according to claim 3, wherein the second quarter-wave plate and the reflector plate are integrated.

9. A liquid crystal (LC) barrier, comprising: a liquid crystal cell receiving non-polarized light emitted from a non-polarized light display unit, comprising an upper substrate, a lower substrate and a cholesteric liquid crystal layer sandwiched between the upper substrate and the lower substrate wherein the cholesteric liquid crystal layer receives the non-polarized light emitted from the non-polarized light display unit and emits circular polarized light without electric field applied to the cholesteric liquid crystal layer;

a first quarter-wave plate provided on the upper substrate to convert the circular polarized light to linearly polarized light; and a polarizer provided on the first quarter-wave plate, wherein an absorption axis of the polarizer forms a predetermined angle with a fast axis of the first quarter-wave plate, such that the linearly polarized light emitted from the first quarter-wave plate then can be completely absorbed by the polarizer; and wherein the LC barrier has only one polarizer.

10. The LC barrier according to claim 9, wherein a side of the upper substrate facing the lower substrate is provided with strip-shaped first electrodes arranged with an interval therebetween; and a side of the lower substrate facing the upper substrate is provided with strip-shaped second electrodes at positions corresponding to the first electrodes.

11. The LC barrier according to claim 10, wherein in the condition that the first electrode and the second electrode are not applied with a voltage therebetween, no electric field is generated between the upper substrate and the lower substrate, such that the liquid crystal molecules in the cholesteric liquid crystal layer are aligned in planar texture; and in the condition that the first electrode and the second electrode are applied with voltage therebetween, a vertical electric field is generated between the upper substrate and the lower substrate, such that the liquid crystal molecules in the cholesteric liquid crystal layer are aligned in the direction of the electric field.

12. The LC barrier according to claim 9, wherein in the condition that the cholesteric liquid crystal layer adopts left-handed liquid crystal, the absorption axis of the polarizer forms an angle of −45° with the fast axis of the first quarter-wave plate; and in the condition that the cholesteric liquid crystal layer adopts right-handed liquid crystal, the absorption axis of the polarizer forms an angle of 45° with the fast axis of the first quarter-wave plate.

13. The LC barrier according to claim 9, wherein the first quarter-wave plate and the polarizer are integrated.

* * * * *